United States Patent
Ouhadi

(10) Patent No.: US 7,737,206 B2
(45) Date of Patent: Jun. 15, 2010

(54) POLYOLEFIN COMPOSITION WITH HIGH FILLER LOADING CAPACITY

(75) Inventor: Trazollah Ouhadi, Liege (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 141 days.

(21) Appl. No.: 11/282,906

(22) Filed: Nov. 18, 2005

(65) Prior Publication Data

US 2007/0117899 A1   May 24, 2007

(51) Int. Cl.
*C08K 3/26* (2006.01)
(52) U.S. Cl. .................... 524/425; 524/502
(58) Field of Classification Search ............ 524/425, 524/502; 428/516, 515, 523, 519
See application file for complete search history.

(56) References Cited

U.S. PATENT DOCUMENTS

| 6,251,995 | B1 | 6/2001 | Hesse et al. | |
|---|---|---|---|---|
| 6,852,424 | B2 * | 2/2005 | Dharmarajan et al. | 428/516 |
| 2004/0198912 | A1 | 10/2004 | Dharmarajan et al. | |
| 2005/0032959 | A1 * | 2/2005 | Cheung et al. | 524/425 |
| 2005/0131152 | A1 | 6/2005 | Dharmarajan et al. | |
| 2005/0222314 | A1 | 10/2005 | Credali et al. | |

\* cited by examiner

*Primary Examiner*—Robert D. Harlan

(57) ABSTRACT

Disclosed are highly filled thermoplastic olefin compositions and, in particular, thermoplastic olefin compositions that comprise propylene/alpha-olefin copolymers and a high level of organic or inorganic filler. Specifically, the description addresses a filled polymer composition comprising: (a) a first polymer component comprising propylene copolymer having a heat of fusion<about 75 J/g and a triad tacticity of from about 50% to about 99%, the first polymer component having a melt flow rate at 230° C.≦about 800 g/10 min.; and (b) at least about 15% by weight of a filler, based on the total weight of the filled composition. Such compositions are useful as sound barriers, flame retardant compositions, roofing membranes, and the like.

13 Claims, No Drawings

POLYOLEFIN COMPOSITION WITH HIGH FILLER LOADING CAPACITY

FIELD OF THE INVENTION

The present invention relates to highly filled thermoplastic olefin compositions and, in particular, to thermoplastic olefin compositions comprising propylene/alpha-olefin copolymers and a high level of organic or inorganic filler.

BACKGROUND OF THE INVENTION

Highly filled polymer systems are used extensively in commercial applications, such as flame retardant (FR) and halogen-free flame retardant (HFFR) applications, sound management such as sound deadening applications, flooring applications, wire and cable applications, polymer master batches, roofing membranes, wall coverings, and automotive applications. Likewise, such highly filled polymer compositions can be used as highly filler loaded master batch.

High to very high melt flow rate polyolefins such as polypropylene and polyethylene homo- and copolymers are used in this field with the limitation to accept high levels of filler and with poor processability and mechanical properties. This does significantly limit their use in the fabrication of finished articles and as a pigment/filler master-batch. At high filler loading the homogeneity is generally low.

It would be desirable to utilize very high levels of filler for these applications, typically at least 15% by weight, preferably at least 30% by weight, further more preferably at least 35% by weight, even more preferably at least 40% by weight, and if achievable, at least 55% by weight and up to 85% by weight filler. However, few polymer compositions are able to incorporate these levels of filler, while still maintaining the performance properties necessary to effectively fabricate the filled polymer compositions into fabricated articles. In particular, propylene-based polymer compositions have not been available that can incorporate the required level of fillers while still maintaining the desired physical properties, such as flexibility, tensile strength, extensibility, elongation, heat resistance, low temperature flexibility, and thermoformability and thermostability during processing.

What is desired is a propylene-based polymer composition that is capable of incorporating large quantities of inorganic and/or organic filler, while simultaneously exhibiting an enhanced balance of physical and mechanical properties as well as good processability for the applications of interest.

SUMMARY OF THE INVENTION

In accordance with the present invention it has surprisingly been found that the above mentioned objects can be solved by the novel embodiments identified in the description below and the appended claims.

In particular, in one embodiment of the present invention, the compositions disclosed herein comprise:

(a) a first polymer component comprising propylene copolymer having a heat of fusion<about 75 J/g and a triad tacticity of from about 50% to about 99%, the first polymer component having a melt-flow rate (MFR) @ 230° C.≦about 800 g/10 min.; and (b) at least about 15% by weight of a filler, based on the total weight of the filled composition.

In another embodiment of the present invention the compositions described herein comprise:

(a) a first polymer component comprising from about 5 to about 25% by weight ethylene and about 75 to about 95% by weight propylene, based on the weight of propylene and ethylene, the first polymer component having a triad tacticity of from about 50% to about 99% and MFR @ 230° C.≦about 800 g/10 min.; and (b) at least about 15% by weight of a filler, based on the total weight of the filled composition.

In yet another embodiment of this invention, the compositions described herein comprise (a) a first polymer component comprising from about 5.0 to about 17.5% by weight ethylene and from about 82.5 to about 92.5% by weight propylene, based on the weight of propylene and ethylene in the first polymer component, the first polymer component having
  i) a heat of fusion<about 75 J/g;
  ii) a triad tacticity of from about 50% to about 99%,
  iii) a MFR @ 230° C.≦about 25/10 min.,
  iii) a molecular weight distribution (MWD) of from about 1.5 to about 3.5;
  iv) a melting temperature less than about 105° C.; and (b) at least about 15% by weight of a filler, based on the total weight of the filled composition.

In addition to the first polymer component (a) as specified above the filled thermoplastic olefin composition may optionally contain at least one second polymer component which is distinct from the first polymer component (a).

The details of these and further embodiments of the invention are set forth in the description below. Other features, objects, and advantages of the invention will be apparent from the description and the claims.

DETAILED DESCRIPTION

The filled polymer composition of the invention comprises at least 15% by weight of an organic or inorganic filler, preferably an inorganic filler, based on the total weight of the composition. The filler preferably comprises at least 30% by weight, more preferably at least 35% by weight and even more preferably at least 40% by weight, based on the total weight of the composition. In some instances, the filler comprises at least 55% by weight based on the total weight of the composition. The maximum amount of filler is, with increasing preference in the order given, up to 85% by weight, up to 70% by weight and up to 60% by weight. Generally, the maximum amount of filler which can be present in a polymer composition depends on the type and particle size of the filler.

The total weight of the composition includes the weight of the filler, the first polymer component and the optional second polymer component and all other components, e.g., extender oils, etc. of the composition.

The first polymer component comprising propylene contains a first polypropylene comprising the propylene/alphaolefin copolymer as described below. Optionally, the composition may also contain one or more additional (second) polymer component(s) that is/are distinct from the first polymer component, preferably selected from those described below in more detail, for instance, polypropylenes that are different from the first polypropylene component, hydrogenated or non-hydrogenated styrenic block copolymers, or functionalized polymers.

The total minimum amount of polypropylene in the composition, i.e., either the first polypropylene component alone or the first polypropylene component in combination with the one or more second polymer components will vary with the end-use application and the desired end-properties of the composition.

For master-batch applications, the polypropylene copolymer acts as a binder for the filler and sufficient polypropylene copolymer is used to allow good dispersion of the filler through the polypropylene copolymer matrix. The amount of polypropylene copolymer needed for a good dispersion depends on the nature of filler and can range from 15 to 85% by weight. Accordingly, the amount of filler may range from about 15% by weight to about 85 methyl percent. In these master-batch applications, the maximum amount of polypropylene copolymer is more a factor of economics and convenience than anything else, and it preferably does not exceed 70% by weight, preferably it does not exceed 50% by weight with the amount of filler being adjusted accordingly.

For other applications, e.g., wire and cable coverings, sound barriers, etc., a greater minimum amount of total polypropylene is typically required than that required in a master-batch application because the polypropylene in these other applications serves as more than a binder. In these other applications, the polypropylene provides important physical properties, e.g., flexibility, mechanical strength, extrudability, etc., to the composition and as such, more polypropylene is usually present, e.g., a minimum of about 30% by weight.

The amount of the other (second) polymer component(s), if used, based on the total amount of the polymer composition, is typically up to about 40% by weight, preferably from about 5 to 30% by weight, more preferably from about 10 to 20% by weight. Optional process oils may be contained in the polymer composition in an amount of up to about 20% by weight, all amounts being based on the total weight of the polymer composition depending on the desired end-use of the composition.

First Polymer Component

The first polymer component is a propylene copolymer, preferably having ≧60% by weight and up to about 95% by weight units derived from propylene, including isotactically arranged propylene derived sequences and also preferably having one of the melting points or heats of fusion disclosed below, e.g., Tm less than about 105° C. or a heat of fusion less than about 75 J/g, or both. Typically, the first polymer component has a low crystallinity (about 2% to about 65%) and can be regarded an elastomer. It contributes towards the flexibility and softness.

According to the present invention the first polymer component is a propylene copolymer. Said propylene copolymer includes at least two different types of monomer units, one of which is propylene. Suitable comonomer units include, but are not limited to, ethylene and higher alpha-olefins ranging from $C_4$ to $C_{20}$, such as, for example, 1-butene, 4-methyl-1-pentene, 1-hexene or 1-octene and 1-decene, or mixtures thereof, for example. Preferably, ethylene is copolymerized with propylene, so that the propylene copolymer includes propylene units (units on the polymer chain derived from propylene monomers) and ethylene units (units on the polymer chain derived from ethylene monomers). The first polymer component may also comprise diene units, e.g., non-conjugated diene units such as (but not limited to) 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD).

The first polymer component preferably contains ≧about 60% by weight, more preferably ≧about 75% by weight and up to about 95% by weight propylene-derived units. In some embodiments, the first polymer component comprises from about 75 to about 94% by weight of propylene-derived units, more preferably from about 80 to about 90% by weight of propylene-derived units, the balance comprising one or more alpha-olefins. Other suitable embodiments include propylene derived units in an amount (based on the weight of propylene and alpha-olefin) ranging from about 75 to about 93% by weight, more preferably about 75 to about 92.5% by weight, more preferably about 75 to about 92% by weight, more preferably about 75 to about 92.5% by weight, more preferably about 82.5 to about 92.5% by weight, and more preferably about 82.5 to about 92% by weight. Corresponding alpha-olefin ranges include about 5 to about 25% by weight, more preferably about 6 to about 25% by weight, more preferably about 7 to about 25% by weight, more preferably about 7.5 to about 25% by weight, more preferably about 7.5 to about 17.5% by weight and more preferably about 8 to about 17.5% by weight (based on the weight of propylene and alpha-olefin). A preferred alpha-olefin is ethylene.

Preferably, the first polymer component has crystalline regions interrupted by non-crystalline regions. The non-crystalline regions may result from regions of non-crystallizable polypropylene segments, the inclusion of comonomer units, or both. The first polymer component has a propylene-derived crystallinity that is isotactic, syndiotactic, or a combination thereof and preferably has isotactic sequences. The presence of isotactic sequences can be determined by NMR measurements showing two or more propylene derived units arranged isotactically. Such isotactic sequences may, in some cases be interrupted by propylene units that are not isotactically arranged or by other monomers that otherwise disturb the crystallinity derived from the isotactic sequences.

In some embodiments, the propylene-derived units of the first polymer component have an isotactic triad fraction of about 65% to about 99%, more preferably about 70 to about 97% and more preferably about 75 to about 97%. In other embodiment, the first polymer component has a triad tacticity as measured by $^{13}C$ NMR, of about 75% or greater, about 80% or greater, about 82% or greater, about 85% or greater, or about 90% or greater.

The triad tacticity of a polymer is the relative tacticity of a sequence of three adjacent propylene units, a chain consisting of head to tail bonds, expressed as a binary combination of m and r sequences. It is usually expressed as the ratio of the number of units of the specified tacticity to all of the propylene triads in the first polymer component. The triad tacticity (mm fraction) of a propylene copolymer can be determined from a $^{13}C$ NMR spectrum of the propylene copolymer and the following formula:

$$mm\ Fraction = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

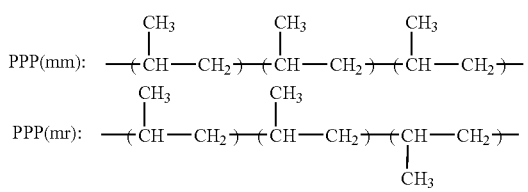

-continued

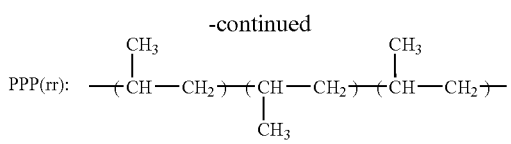

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

Due to the introduction of errors in the insertion of propylene and/or by the presence of comonomer, the crystallinity and the melting point of the first polymer component is reduced compared to highly isotactic polypropylene. For example, the propylene-derived crystallinity of the first polymer component may range from about 2-65%, more preferably from about 5-40% as measured by Differential Scanning Calorimetry (DSC)

Melting point (Tm), heat of fusion (Hf) and % crystallinity are/were determined using the following procedure according to ASTM E 794-95. Differential scanning calorimetric (DSC) data was obtained using a Perkin-Elmer DSC 7 machine. Preferably, about 5 mg to about 10 mg of a sheet of the polymer to be tested is pressed at approximately 200° C. to 230° C., then removed with a punch die and annealed at room temperature for 48 hours. The samples were then sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The % crystallinity (X %) is calculated using the formula, X %=[area under the curve (Joules/gram)/B(Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. For the semi-crystalline polymers, having appreciable crystallinity, the melting temperature is typically measured and reported during the second heating cycle (or second melt). For the semi-amorphous polymers, having comparatively low levels of crystallinity, the melting temperature is typically measured and reported during the first heating cycle. Prior to the DSC measurement, the sample is aged (typically by holding it at ambient temperature for a period up to about 5 days) or annealed to maximize the level of crystallinity.

The melting point can be measured using the DSC test described above. Using the DSC test, the melting point is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak may be at a low temperature and be relatively flat, making it difficult to determine the precise peak location. Furthermore, as with the DSC method, the peak location may be influenced by annealing and relaxation treatments. Therefore, it is recommended that the sample pretreatment procedure stated above for the DSC be followed.

The first polymer component has a heat of fusion of <about 75 J/g, preferably ≦about 50 J/g, more preferably ≦about 45 J/g, more preferably ≦about 40 J/g, more preferably ≦about 35 J/g, more preferably about 5 to about 35 J/g, more preferably about 7 to about 25 J/g.

The first polymer component may have any one of the following melting points, ranging from a lower limit of about 25° C., or about 30° C., or about 35° C., or about 40° C., or about 45° C., or about 50° C., to a higher limit of about 105° C., or about 100° C., or about 95° C., or about 90° C., or about 85° C., or about 80° C., or about 85° C., or about 80° C., or about 75° C., or about 70° C. In other specific embodiments, the melting point of the propylene copolymer can be expressed as any one of a selection of ranges, e.g., ranges of from about 30° C. to about 70° C. or from about 40° C. to about 50° C.

The first polymer component preferably has a melt flow rate (MFR) ≦about 800 g/10 min., more preferably ≦about 500 g/10 min., more preferably ≦about 200 g/10 min., more preferably ≦ about 100 g/10 min., more preferably ≦ about 50 g/10 min. Particularly preferred embodiments include a polymer component with an MFR of ≦about 25 g/10 min, such as from about 1 to about 25 g/10 min., more preferably about 1 to about 20 g/10 min. The MFR is determined according to ASTM D-1238, condition L (2.16 kg, 230° C.).

In one or more embodiments, the first polymer component is made using random polymerization methods, including those described in U.S. Pat. Nos. 6,288,171; 6,525,157; 5,001,205; WO 96/33227; WO 97/22639; U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; 5,677,375; 5,693,727; 3,248,179; 4,613,484; 5,712,352; EP-A-0 794 200; EP-A-0 802 202; and EP-A-0 634 421. However, the first polymer component is not limited by any particular polymerization method. Suitable polymerization methods include solution, for example The first polymer component is also not limited by any or any particular type of reaction vessel. The first polymer component may in certain embodiments be formed in a single reactor. The first polymer component may in certain embodiments be formed in one or more series reactors (e.g., two or more reactors arranged in series). The first polymer component may in certain embodiments be formed in a batch reactor. Preferably, the continuous polymerization methods have sufficient back-mixing such that there are no concentration gradients within the reactor. Preferably, the first polymer component is formed using solution polymerization (as opposed to slurry or gas-phase polymerization) such that the catalyst system exists in a single-phase environment.

Furthermore, the first polymer component is not limited by any particular catalyst or catalyst system. In one or more embodiments, the catalyst system may include one or more transition metal compounds and one or more activators. Multiple activators may be used, including using mixtures of alumoxanes or aluminum alkyls with ionizing activators. When alumoxane or aluminum alkyl activators are used, the combined pre-catalyst-to-activator molar ratio is from 1:5000 to 10:1. When ionizing activators are used, the combined pre-catalyst-to-activator molar ratio is from 10:1 to 1:10. In one or more embodiments, the one or more catalyst systems disclosed in U.S. Patent Application 20040024146 published Feb. 5, 2004, may be used. In one or more embodiments, non-metallocene, metal-centered, heteroaryl ligand catalyst systems as described in U.S. Patent Application 20030204017 published Oct. 30, 2003, may be used.

Preferably, the first polymer component may be made in the presence of a metallocene catalyst system. As a non-limiting example, illustrative metallocene catalyst systems may include, but are not limited to, a bis-indenyl compound, particularly a bridged bis-indenyl compound, and even more particularly a bridged bis-indenyl compound without any 2-substitutions. Alternatively, however, in one or more specific embodiments, any polymer component used in an elastomeric structure may be prepared using a single site catalyst capable of permitting tactic insertion. For example, in at least certain embodiments, a polymer made in accordance with the disclosure of WO 03/0404201 may qualify as a first polymer component. The disclosure of WO 03/0404201 is incorporated herein by reference as if fully set forth herein.

In one or more embodiments, the first polymer component has a Shore A hardness of less than about 90. In one or more embodiments the first polymer component a Shore A hardness of about 45 to about 90. In one or more embodiments, the first polymer component has a Shore A hardness of about 55 to about 80.

In one or more embodiments, the first polymer component may have a molecular weight distribution (MWD) $M_w/M_n$ ranging from about 1.5 to about 40; or from about 2 to about 20; or from about 2 to about 10; or from about 2 to about 5. In a preferred embodiment the MWD is from about 1.5 to about 3.5. In one or more embodiments, the first polymer component may have a number average molecular weight (Mn) of from about 10,000 to about 5,000,000; or from about 40,000 to about 300,000; or from about 80,000 to about 200,000, as determined by gel permeation chromatography (GPC). In one or more embodiments, the first polymer component may have a weight average molecular weight ($M_w$) within the range having an upper limit of about 5,000,000 or about 1,000,000 or about 500,000 g/mol, and a lower limit of about 10,000, or about 15,000, or about 20,000, about 60,000, about 70,000, about 75,000 or about 80,000 g/mol. Further, the first polymer component may have a Mooney viscosity (ML (1+4) @ 125° C.) from a low of 50 about, or about 60, or about 75, to a high of about 80, or about 90, or about 100 (ASTM D 1646-94).

Filler Component

The fillers used in the practice of this invention can be either solid inorganic fillers and/or solid organic fillers. The term "filler" encompasses both pigments and additives such as, for instance, flame retardants. By the term "solid" there is meant that the material is solid at temperatures of up to about 40° C. In alternative embodiments of the invention the amount of filler present in the polymer composition is at least about 15% by weight, at least about 20% by weight, at least 30% by weight, at least about 35% by weight, at least about 40% by weight, and at least about 55% by weight, based on the total amount of the polymer composition and depending on the type of filler material used. On the other hand the amount of filler may be up to about 85% by weight, preferably up to about 70% by weight. In certain instances and for certain types of filler the amount used may be up to 50% by weight. Organic fillers include such materials as cellulose, starch, pigments such as carbon black and color concentrates, organic UV-stabilizers, organic heat-stabilizers, organic flame retardants such as halogenated, for instance, bromine containing flame retardants, flour, wood flour, and polymeric fibers like polyester-based, polyamide-based materials.

Inorganic fillers are the preferred fillers for use in this invention. Preferred examples of inorganic fillers are talc, calcium carbonate, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres and chalk. Of these fillers, barium sulfate, talc, calcium carbonate, silica/glass, glass fibers, alumina, aluminum trihydroxide, magnesium hydroxide and titanium dioxide, and mixtures thereof are preferred. The most preferred inorganic fillers are talc, magnesium hydroxide, aluminum trihydroxide, calcium carbonate, barium sulfate, glass fibers or mixtures thereof. For flame resistance applications, the preferred flame-retardant fillers include magnesium hydroxide, aluminum trihydroxide (also referred to as alumina trihydrate) and mixtures of two or more of these materials, red amorphous phosphorous, polyphosphates, alkyl phosphates, alkyl phosphonates, amine phosphates, aminoalkyl phosphates, ammonium phosphates, ammonium polyphosphates, antimony oxide, and zinc borates.

For some applications the use of two or more fillers is preferred. Examples of useful filler blends include barium sulfate and calcium carbonate for sound barriers, and carbon black and calcium carbonate and/or talc for conductive flooring. The respective amount of each filler in these blends is well within the skill of the ordinary artisan.

Optional Second Polymer Component

In order to adjust the properties of the final highly filled polymer composition a second polymer component or a combination of second polymer components may be contained. Said second polymer component(s) is distinct from the first copolymer component. Depending on the kind and amount of second polymer component(s) added the final polymer composition will have thermoplastic, elastomeric, or thermoplastic elastomeric properties.

Suitable second polymer components that may be included in the filled polymer composition of the invention are selected from thermoplastic polyolefins and olefinic rubbers such as synthetic rubbers or natural rubber, butyl rubbers, copolymers of $C_{4-7}$ isomonoolefin and a para-$C_{1-4}$ alkylstyrene, nitrile rubbers, polychlorinated butadienes, and blends thereof.

Thermoplastic polyolefins suitable for use in the composition of the invention include thermoplastic, crystalline polyolefin homopolymers and copolymers. They are desirably prepared from monoolefin monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferred, however, are monomers having 3 to 6 carbon atoms, with propylene being most preferred. As used in the specification and claims the term polypropylene includes homopolymers of propylene as well copolymers comprising propylene. In conjunction with the second polymer component by "copolymers comprising propylene" there are meant reactor copolymers of polypropylene (reacted blends) and random copolymers containing more than 94% by weight of propylene, the remainder being selected from the comonomers (other than propylene) mentioned above, preferably ethylene. Typically, the random copolymers of polypropylene with ethylene contain about 1 to about 6 wt %, preferably less than about 6 wt % of ethylene and/or about 1 to about 30 wt % of an alpha-olefin comonomer of 4 to 16 carbon atoms, and mixtures thereof. The polypropylene can be highly crystalline isotactic or syndiotactic polypropylene. Commercially available polyolefins may be used in the practice of this invention. Further polyolefins which can be used in terms of the invention are high, low, linear-low, very low-density polyethylenes and copolymers of ethylene with (meth)acrylates and/or vinyl acetates.

The polyolefins mentioned above can be made by conventional Ziegler/Natta catalyst-systems or by single-site catalyst-systems including polyolefins such as polyethylene copolymers obtained by metallocene catalysis with butene, hexene or octene as the comonomer said polyethylene copolymers having a density as low as $0.855$ g/cm$^3$. It is well known in the art that the amount of comonomer present in a polyethylene copolymer determines the density of the copolymer. Metallocene polymers or plastomers refer to polymers or plastomers prepared using a class of well known highly active olefin catalysts known as metallocenes. These catalysts, particularly those based on group IV B transition metals such as zirconium, titanium and hafnium, show high activity in ethylene polymerization. The metallocene catalysts are also flexible in that, by manipulation of catalyst composition and reaction conditions, they can provide polyolefins with controllable molecular weights, as low as about 200 up to about 1 million or higher, and molecular weight distribution, from extremely narrow to broad. Exemplary of the development of metallocene catalysts for the polymerization of ethylene is found in U.S. Pat. No. 4,937,299 to Ewen et al., hereby incorporated by reference. Metallocene catalysts are useful in making controlled ultra-uniform and super random specialty copolymers. For example, if a lower density ethylene copolymer is made with a metallocene catalyst, such as very low density polyethylene (VLDPE), an ultra uniform and super random copolymerization will occur, as contrasted with the polymer produced by copolymerization using a conventional Ziegler catalyst.

Suitable olefinic rubbers include monoolefin copolymer rubbers comprise selected from non-polar, rubbery copolymers of two or more alpha-monoolefins, preferably copolymerized with at least one polyene, usually a diene. Saturated monoolefin copolymer rubber, for example, ethylene/propylene copolymer rubber (EPM; about 45 to about 80% by weight of ethylene) or unsaturated monoolefin rubber such as ethylene/propylene/diene (EPDM; about 45 to about 80% by weight of ethylene, about 0.1 to about 15% by weight of non-conjugated diene, remainder being propylene) rubber can be used. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD) and vinyl norbornene (VNB).

Butyl rubbers are also useful in the compositions of the invention. The term "butyl rubber" includes copolymers of an isoolefin and a conjugated monoolefin, terpolymers of an isoolefin with or without a conjugated monoolefin, divinyl aromatic monomers and the halogenated derivatives of such copolymers and terpolymers. Useful butyl rubber copolymers comprise a major portion of isoolefin and a minor amount, usually less than about 30 wt %, of a conjugated multi-olefin. The preferred copolymers comprise about 85 to 99.5 wt % of a $C_{4-7}$ isoolefin such as isobutylene and about 15 to 0.5 wt % of a multi-olefin of 4 to 14 carbon atoms, such as isoprene, butadiene, dimethyl butadiene and piperylene. Commercial butyl rubber, chlorobutyl rubber, bromobutyl rubber, useful in the invention, are copolymers of isobutylene and minor amounts of isoprene with less than about 3% halogen for the halobutyl-derivatives. Other butyl co- and terpolymer rubbers are illustrated by the description in U.S. Pat. No. 4,916,180, the disclosure of which is incorporated herein by reference.

Another suitable copolymer within the scope of the olefinic rubber of the present invention is a copolymer of a $C_{4-7}$ isomonoolefin and a para-$C_{1-4}$ alkylstyrene and, preferably, a halogenated derivative thereof. The amount of halogen in the copolymer, predominantly in the para-alkylstyrene, is from about 0.1 to 10 wt %. A preferred example is the brominated copolymer of isobutylene and para-methylstyrene. These copolymers are more fully described in U.S. Pat. No. 5,162,445, the disclosure of which is incorporated herein by reference.

A further olefinic rubber suitable in the invention is natural rubber. The main constituent of natural rubber is the linear polymer cis-1,4-polyisoprene. It is normally commercially available in the form of smoked sheets and crepe. Synthetic polyisoprene can also be used. Furthermore polybutadiene rubber and styrene-butadiene-copolymer rubbers can also be used.

Further suitable rubbers are nitrite rubbers. Examples of the nitrite group-containing rubber include a copolymer rubber comprising an ethylenically unsaturated nitrite compound and a conjugated diene. Further, the copolymer rubber may be one in which the conjugated diene units of the copolymer rubber are hydrogenated. Specific examples of the ethylenically unsaturated nitrite compound include acrylonitrile, alpha-chloroacrylonitrile, alpha-fluoroacrylonitrile and methacrylonitrile. Among them, acrylonitrile is particularly preferable. Examples of the conjugated diene include 1,3-butadiene, 2-chlorobutadiene and 2-methyl-1,3-butadiene (isoprene). Among them, butadiene is particularly preferable. Especially preferred nitrite rubbers comprise copolymers of 1,3-butadiene and about 10 to about 50 percent of acrylonitrile.

Other suitable rubbers in terms of the present invention are based on polychlorinated butadienes such as polychloroprene rubber. These rubbers are commercially available under the trade names Neoprene® and Bayprene®.

Blends of any of the above olefinic rubbers can be employed, rather than a single olefinic rubber.

Another useful second polymer components are thermoplastic elastomers selected from block-copolymer of styrene/conjugated diene/styrene, with the conjugated diene optionally being fully or partially hydrogenated, or mixtures thereof. Generally this block-copolymer may contain about 10 to about 50 weight %, more preferably about 25 to about 35 weight % of styrene and about 90 to about 50 weight %, more preferably about 75 to about 35 weight % of the conjugated diene, based on said block-copolymer. Most preferably, however, is a block-copolymer which contains about 30 weight % of styrene and about 70 weight % of the conjugated diene. The conjugated diene is selected from butadiene, isoprene or mixtures thereof. Specific block-copolymers of the styrene/conjugated diene/styrene-type are SBS, SIS, SIBS, SEBS and SEPS block-copolymers. These block-copolymers are known in the art and they are commercially available.

Functionalized polymers may be used in the polymer composition of the invention, for instance, in order to impart adhesion to polar substrates like glass, polyamide, polyester, polycarbonate, metal, etc. The functionalized polymers are selected from functionalized polyolefins and functionalized rubbers. The functionalized polyolefin desirably has from about 0.05 to about 6 mole percent functional groups, and more desirably from about 0.1 or 0.3 to about 3 or 1 mole percent functional groups, based upon total repeating units in the polymer. The functional groups may be from monomers copolymerized with the olefin monomers or may be added by post-polymerization functionalization such as by grafting unsaturated monomers onto polyolefins as disclosed in, for instance, U.S. Pat. No. 5,637,410 which describes carboxylic acid grafting in columns 1 and 2. Desirably, at least about 70, about 80, or about 90% by weight of the repeating units for this polyolefin are olefin monomers of about 2 to about 8 carbon atoms and more preferably about 2 or about 3 carbon atoms. For the purposes of this application, functional groups will be defined as groups with heteroatoms other than carbon and hydrogen. Examples of functional groups include epoxy function, carboxylic acid groups, anhydrides from dicarboxylic or polycarboxylic acids, such as the group derived from grafting maleic anhydride to a polyolefin backbone. Preferred groups are carboxylic acid groups or anhydrides of two or more carboxylic acids or epoxy group. Thus the functionalized polyolefin can be represented by polypropylene homopolymer, polyethylene homopolymer, block or random copolymers of ethylene/propylene, random copolymers of ethylene and a $C_{4-12}$ alpha-olefin, terpolymers of propylene/ethylene/$C_{4-12}$ alpha-olefin, a copolymer of acrylic acid and ethylene or propylene; a terpolymer of ethylene, vinyl acetate and acrylic acid; or a terpolymer of ethylene, methyl acrylate, acrylic acid; etc.

The polymer backbone of the functionalized material can also be a maleic anhydride modified hydrogenated styrene/butadiene/styrene (SBS) and/or hydrogenated styrene/butadiene/styrene (SEBS).

The functionalized rubbers can be based on the rubbers as specified above in conjunction with the second polymer component and the functional groups are selected from those mentioned above with the functionalized polyolefins. Likewise, the amount of the functional groups in the functionalized rubber can be the same as specified above in conjunction with the functionalized polyolefins.

The preparation of the functionalized material can be conducted according to methods known to the skilled person. Various techniques for effecting functionalization can be used including those described in M. Xanthus (editor), Reactive Extrusion: Principles and Practice, Hauser, 1992, the disclosure of which is incorporated herein by reference. Functionalization is carried out with at least one type of functionalizing agent, such as, for instance, maleic anhydride. The amount of the functionalized polymer in the composition of the invention may be up to about 40% by weight, preferably up to about 25% by weight, preferably at least about 5% by weight. The functionalized polymer can be used in addition to or in place of the second polymer component, with the total amount of functionalized polymer and second polymer compound, preferably representing 60% by weight, more preferably 40% by weight, based on the total amount of the composition.

Process Oil

The composition of this invention may also include up to about 20% by weight, based on total weight of the composition, of one or more process oils, such as paraffinic, naphthenic, or aromatic extender oils.

Other Additives

The compositions of this invention also can include one or more additional components, such as polymer additives (e.g., antioxidants such as hindered phenols or phosphites), light stabilizers (e.g., hindered amines), antiblock and slip agents, processing aids (e.g., oils, stearic acid or its metal salt), colorants or pigments, blowing agents, carbon black, and surface active agents, to the extent that the additive does not interfere with desired physical properties of the composition. The additives are employed in functionally equivalent amounts known to those skilled in the art, generally in amounts of up to about 10% by weight, preferably from about 0.01 to about 5% by weight, more preferably from about 0.02 to about 1,% by weight, based upon the total weight of the filled thermoplastic olefin composition.

Additionally, organic acids and/or their salts can be added to the filled compositions to enhance their processability and to enhance the dispersion of the filler in the polypropylene. Here too, these additives are used in amounts know to those skilled in the art.

Blending

The filled thermoplastic olefin compositions can be compounded by any convenient method, such as dry blending of the polymer component (a), the filler (s) and optional second polymers and additives, plasticizers, etc., and subsequently melt-mixing at a temperature above the melting temperature of the thermoplastic component, either directly in an extruder used to make the finished article, or by pre-melt mixing in a separate extruder (for example, a Banbury mixer). Dry blends of the compositions can also be directly injection molded without pre-melt mixture. Examples of machinery capable of generating the shear and mixing include extruders with kneaders or mixing elements with one or more mixing tips or flights, extruders with one or more screws, extruders of co- or counter-rotating type, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (<3000 rpm). The blend may contain additives, which can be introduced into the composition at the same time as the other components or later at down stream in case of using an extruder or Buss kneader or only later in time. Examples of such additives are antioxidants, processing oils, anti-blocking agents, antistatic agents, ultraviolet foaming agents, processing aids. Such additives may be contained in the thermoplastic composition in an amount of from about 0.1 to about 15% by weight, based on the total weight of the thermoplastic composition. The additives can be added to the blend in pure form or in master-batches. The process oil or plasticizer can be added in one addition or in multiple additions. Preferably, the plasticizers are added after sufficient molten-state mixing of the polymer component and the optional one or more second polymers.

Alternatively, the polymer component and the second polymer(s), if present, may be blended prior to the incorporation of the filler. The blend can either be a physical blend or an in-reactor blend manufactured by in-reactor processes as known to those of ordinary skill in the art. Preferably, the filled thermoplastic olefin composition comprises the filler together with an in-reactor blend of a first polymer component (propylene/alpha-olefin copolymer) and, if present, a second polymer, such as the propylene/alpha-olefin copolymer. The in-reactor blend preferably is made using a series or parallel solution polymerization process as known to those of ordinary skill in the art The compositions can be processed to fabricate articles by any suitable means known in the art. For example, the filled thermoplastic olefin composition can be processed to films or sheets or to one or more layers of a multi-layered structure by known processes, such as calendering, casting or co-extrusion. Injection molded, compression molded, extruded or blow molded parts can also be prepared from the filled thermoplastic olefin compositions of the present invention. Alternatively, the filled thermoplastic olefin compositions can be processed by profile extrusion processes to make articles, such as wire and cable, pipe and tubing, gaskets, molded articles, and floorings. The extrudate can also be milled, chopped, granulated or pelletized.

The compositions of this invention are also useful in the preparation of master-batches. For example, the addition of pigment or color concentrates to a polymer is often through the use of a master-batch. In this example, a first polymer component and the optional second polymer that is (are) compatible with the polymer to be filled or colored, is highly filled with the filler/pigment or concentrate to form a master-batch. Then said master-batch is added to the polymer to be colored. The compositions of this invention can contain more pigment or colorant than conventional compositions.

Generally, the highly filled polypropylene compositions of the present invention can be used in flame retardant (FR) and halogen-free flame retardant (HFFR) applications, sound management such as sound deadening applications, gap filler, flooring applications, wire and cable applications, polymer master-batches, roofing membranes, wall coverings, automotive applications, soft grip with high density, articles having a high density to be used water or other polar fluids, and high density films. Likewise, such highly filled polymer compositions can be used as highly filler loaded master-batch, for instance, for pigments. In the latter case the polypropylene functions as a carrier for the pigment.

The compositions of the present invention exhibit very good mechanical properties such as tensile strength and tear strength while being processable, for instance, by injection molding, despite of the very high filler content.

The invention will be described in more detail herein below by reference to the examples. The examples are not to be construed to limit the scope of the invention.

EXAMPLES

Materials and Methods:
The first polymer component is a propylene copolymer A which is a metallocene catalyzed propylene-ethylene copolymer containing 16 wt % of ethylene. The melting point is about 50° C., the heat of fusion is about 15 J/g, the Mooney viscosity [ML (1+4) at 125° C.] is 25, as measured according to ASTM D 1646, the MFR is 3 g/10 minutes as measured at 230° C. at a 2.16 kg load, the MWD is 2.2 and the triad tacticity is 90.9%. PP HL 512 FB is a homopropylene with MFR of 1200 g/10 minutes, as measured at 230° C. at a 2.16 kg load.

Omya BL is $CaCO_3$ commercially available from Omya.

Exact 5062 is an ethylene/octene copolymer is a metallocene catalyzed ethylene/octene copolymer having a density of 0.860 g/cm$^3$ and a MFI of 0.5 g/10 minutes, as measured at 190° C. at a 2.16 kg load. This copolymer is available from ExxonMobil.

Injection molding has been conducted with an Engel ES500/125 tons machine. The mould used is an ISO 2 mm mould. For typical injection conditions see Table 4. Variations were made in injection pressure with different contents of filler.

The polymer blends were made in a 1.6 liter Banbury Internal Mixer at a load of 80% and a chamber temperature of 200° C. The total amount of the first propylene copolymer was added at 120 rpm. As the temperature reached 165° C. the $CaCO_3$ was added in small quantities. If all $CaCO_3$ has been added mixing was continued at 170 rpm. After the temperature reaches 170° C. mixing was continued for 3 minutes more before dumping. Optionally, the PP was added after the $CaCO_3$ at 120 rpm.

Test Methods

| Parameter | Method | Test Speed/Conditions | Specimen Size |
|---|---|---|---|
| Hardness | ISO 868 | 15 s delay | Disk 2 mm/50 mm (thickness/diameter) |
| Tensile Strength | ISO 37 | 500 mm/min | Type 2 dumbbell 2 mm ISO plaque |
| Tear Strength | ISO 34 | 500 mm/min | Angle/without nick 2 mm ISO plaque |
| Density | ISO 1183 | RT | Disk 2 mm/30 mm (thickness/diameter) |
| MFR | ISO 1133 | 230° C.; 2.16 kg | pellets |
| Haze | TPE 0135 | Illuminant C, observer 2°, TTRAN | 2 mm ISO plaque |

TABLE 1

| | Norm/Unit | Sample 1 | Sample 2 |
|---|---|---|---|
| Ingredients wt % | | | |
| Propylene Copolymer A | | 60 | 50 |
| $CaCO_3$ (Omya BL) | | 40 | 40 |
| PP HL 512 FB | | 0 | 10 |

TABLE 1-continued

|  | Norm/Unit | Sample 1 | Sample 2 |
|---|---|---|---|
| Properties |  |  |  |
| Hardness | ISO 868-65/ShA | 50 | 80 |
| Density | g/cm$^3$ | 1.16 | 1.16 |
| MFR | 2.16 kg, 230° C. | 3.26 | 8.42 |
| Perpendicular to Flow |  |  |  |
| Modulus at 100% | ISO 37 Type 2/MPa | 0.9 | 3.0 |
| Modulus at 200% | ISO 37 Type 2/MPa | 0.9 | 3.0 |
| Modulus at 300% | ISO 37 Type 2/MPa | 1.0 | 3.2 |
| Elongation | ISO 37 Type 2/% | 1954 | 1266 |
| Tensile | ISO 37 Type 2/MPa | 6.0 | 12.8 |
| Tear | ISO 34 B, b/KN/m | 21 | 44 |
| Parallel to Flow |  |  |  |
| Modulus at 100% | ISO 37 Type 2/MPa | 1.1 | 3.7 |
| Modulus at 200% | ISO 37 Type 2/MPa | 1.1 | 3.9 |
| Modulus at 300% | ISO 37 Type 2/MPa | 1.3 | 4.2 |
| Elongation | ISO 37 Type 2/% | 1604 | 800 |
| Tensile | ISO 37 Type 2/MPa | 6.7 | 6.9 |
| Tear | ISO 34 B, b/KN/m | 20 | 43 |

TABLE 2

|  | Sample 3 | Sample 4 | Sample 5 | Comparative 1 | Comparative 2 | Comparative 3 |
|---|---|---|---|---|---|---|
| Ingredients (wt %) |  |  |  |  |  |  |
| Propylene Copolymer A | 40 | 30 | 20 | 0 | 0 | 0 |
| CaCO$_3$ (Omya BL) | 60 | 70 | 80 | 60 | 70 | 80 |
| Exact 5062 | 0 | 0 | 0 | 40 | 30 | 20 |
| Tensile (ISO 37 Type2) |  |  |  |  |  |  |
| Mod 100 (MPa) | 3.0 | 3.4 | 3.4 | 3.1 | 3.5 | — |
| Mod 200 (MPa) | 3.1 | 3.1 | — | 2.7 | — | — |
| Mod 300 (MPa) | 3.7 | 3.5 | — | 2.7 | — | — |
| Tensile (MPa) | 8.9 | 4.8 | 5.4 | 3.3 | 3.8 | 0.9 |
| Tear N/m (ISO 34 B, b) | 34 | 27 | 27 | 30 | 22 | 18 |

As is apparent from Table 2 the tensile strength and tear of the inventive formulations 3, 4 and 5 is significantly improved over those of the Comparative Samples despite of containing the same high amount of calcium carbonate filler.

TABLE 3

Typical injection molding conditions to prepare ISO 2 mm plaques of 100 × 150 × 2 mm for mechanical properties evaluation:

| Temperature Profile (° C.) |  |
|---|---|
| Zone 1 | 180 |
| Zone 2 | 180 |
| Zone 3 | 170 |
| Zone 4 | 140 |
| Mould temperature | 40 |
| Speed (mm/sec) |  |
| Injection speed | 40 |
| Plast. speed (%) | 60 |
| Plasticizing (mm) |  |
| Stroke (C1) | 59 |
| Screw pos. (C2) | 3 |
| Switchover to 2nd P (C3) | 15 |
| Pressure (bar) |  |
| Injection Pressure 2nd (P7-P11) | 60 |
| Injection Pressure 2nd (P12-P16) | 60 |
| Hydr. P act. value (PHu) | 100 |
| Back Pressure (PSx) | 0 |
| Clamping force | 1000 |
| Time (sec) |  |
| Total cycle time (ZUs) | 58 |
| Injection time (ZSx) | 1.25 |
| Injection time 2nd P (Z2) | 10 |
| Cooling time (Z4) | 40 |

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A filled polymer composition consisting essentially of:
   (a) a first polymer component comprising propylene copolymer having a heat of fusion<about 75 J/g, a triad tacticity of from about 50% to about 99%, a melt flow rate @ 230° C.≦about 800 g/10 min., a propylene content of 75 to 95% by weight, an ethylene content of 5 to 25% by weight, a Tm less than about 105° C., and a molecular weight distribution of 1.5 to 3.5;
   (b) at least about 40% by weight of a filler, based on the total weight of the filled composition;
   (c) from 0 to 40 wt % homopolypropylene; and
   (d) from 3 to 40 wt % of a synthetic or natural rubber;
   where the filled polymer composition has a tensile strength greater than or equal to 4.8 mPa and an elongation of greater than or equal to 800%.

2. The composition according to claim 1 wherein the first polymer component further comprises a diene-based unit.

3. The composition of claim 1 in which the filler comprises at least 55 to 85% by weight of the composition.

4. The composition of the claim 1 in which the filler is an inorganic filler.

5. The composition of the claim 4 in which the filler is a flame retardant inorganic filler.

6. The composition of claim 4 in which the filler is at least one of magnesium hydroxide, calcium carbonate and aluminum trihydroxide.

7. A filled polymer composition consisting essentially of:
(a) a first polymer component comprising from about 7.5 to about 17.5% by weight ethylene and from about 82.5 to about 92.5% by weight propylene, based on the weight of propylene and ethylene in the first polymer component, the first polymer component having
  (i) a heat of fusion<about 75 J/g;
  (ii) a triad tacticity of from about 50% to about 99%,
  (iii) a melt-flow rate @ 230° C.≦about 25 g/10 min.,
  (iv) a molecular weight distribution of from about 1.5 to about 3.5; and
  (v) a melting temperature of about 105° C. or less; and
(b) at least about 55% by weight of a filler, based on the total weight of the filled composition;
(c) from 0 to 40 wt % homopolypropylene; and
(d) from 3 to 40 wt % of a synthetic or natural rubber;
where the filled polymer composition has a tensile strength greater than or equal to 4.8 mPa and an elongation of greater than or equal to 800%.

8. The composition of claim 7 in which the filler comprises at least 55 to 85% by weight of the composition.

9. The composition of the claim 8 in which the filler is an inorganic filler.

10. The composition of the claim 9 in which the filler is a flame retardant inorganic filler.

11. The composition of claim 9 in which the filler is at least one of magnesium hydroxide, calcium carbonate and aluminum trihydroxide.

12. The composition of claim 1, where the synthetic rubber is selected from the group consisting of ethylene/propylene copolymer rubber, ethylene/propylene/diene copolymer rubber, butyl rubber, nitrile rubber, and block-copolymers of styrene and conjugated diene.

13. The composition of claim 7, where the synthetic rubber is a maleic anhydride modified hydrogenated styrene/butadiene/styrene or hydrogenated styrene/butadiene/styrene rubber.

* * * * *